Sept. 14, 1954   R. C. LINDBERG   2,689,118
CUTTER HEAD FOR MINING MACHINES
Filed April 18, 1950
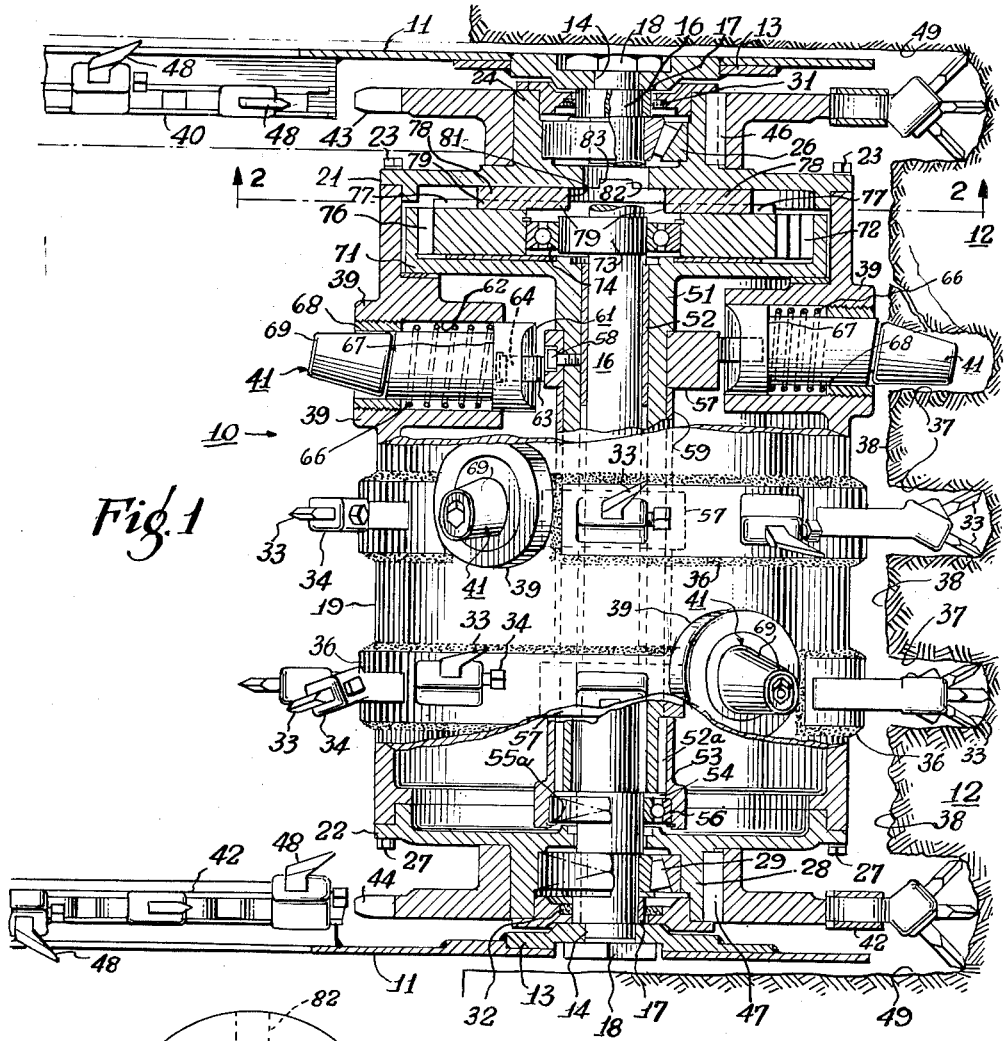
Fig.1
Fig.2
Fig.3
INVENTOR.
Richard C. Lindberg
BY
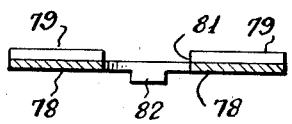
ATTORNEY Patented Sept. 14, 1954

2,689,118

UNITED STATES PATENT OFFICE 2,689,118

CUTTER HEAD FOR MINING MACHINES

Richard C. Lindberg, Chicago, Ill., assignor to Goodman Manufacturing Company, Chicago, Ill., a corporation of Illinois Application April 18, 1950, Serial No. 156,608

7 Claims. (Cl. 262—9)

This invention relates to improvements in machines for removing coal from the vein or seam without blasting, and has particular reference to an improved cutting head for a continuous miner.

This invention represents an improvement over the invention disclosed in an application of Richard C. Lindberg, Serial No. 156,607, filed April 18, 1950, for Improvements in Cutting Heads for Continuous miners.

One of the principal objects of this invention is to provide a simple mechanism for deriving a motion from the rotative movement of a cutter head of a continuous miner, and to employ the motion so derived to move breaker members radially with respect to the cutter head for breaking the cores formed between the kerfs cut by the cutter bits mounted on the cutter head.

Another object is to afford a simple coupling arrangement which will transmit power from a rotating cutting head of a continuous miner to a shaft employed to impart radial motion to breakers supported in the rotary cutting head, and impart a desired motion to said shaft so that the breakers will move radially with respect to the axis of rotation of said rotary cutting head in timed relationship to the rotation of the rotary cutting head.

Other objects and important features of the invention will be apparent from a study of the following description taken together with the drawing which together illustrate a preferred embodiment of the invention and what is now considered to be the best mode of applying the principles thereof. It is not intended, however, that the invention be limited by the embodiment shown nor otherwise than by the terms of the claims subjoined.

In the drawing:

Fig. 1 is a longitudinal section through a rotary cutting head according to the present invention, certain portions thereof being shown in elevation;

Fig. 2 is a view looking in the direction of the arrows 2—2 of Fig. 1 showing details of a coupling member for imparting rotation to a shaft for moving the breakers shown in Fig. 1 radially with respect to the axis of rotation of the rotary cutting head;

Fig. 3 is a section taken along the line 3—3 of Fig. 2 looking in the direction of the arrows.

Referring now to the drawing, the present invention is shown as embodied in a rotary cutting head 10 of a continuous mining machine. The rotary cutting head 10 is supported for rotation on a pair of spaced frames 11 which are movable with respect to a coal seam 12 by mechanism, not shown, of a combined cutting and loading machine as may be disclosed in Cartlidge application Serial No. 116,684, filed September 20, 1949. A gudgeon plate 13 is welded to each frame 11 and is bored at 14 to receive a stationary shaft 16 extending across the spaced frames 11. The shaft 16 has a shoulder 17 at each end which bears against the inner face of the gudgeon plates 13, and a nut 18 is threaded to each end of the shaft 16 to bear against the outer face of the gudgeon plates 13 and thus hold the shaft 16 in position on the frames 11.

The rotary cutting head 10 is mounted for rotation on the shaft 16 and includes a generally cylindrical shell 19 supported on end bells 21 and 22. The end bell 21 is secured to the shell 19 by cap bolts 23, and is provided with a flange 24 affording a recess for a bearing 26 fitted to the shaft 16. The end bell 22 is likewise secured to the shell 19 by cap bolts 27, and is also provided with a flange 28 forming a recess for a bearing 29 fitted to the shaft 16 adjacent its other end.

The flange 24 is closed by an oil seal 31 surrounding the shaft 16 which thus prevents entrance of dirt or foreign material to the bearing 26, and the flange 28 is likewise closed by an oil seal 32 surrounding the other end of the shaft which also prevents entrance of dirt or other foreign material to the bearing 29.

The cylindrical shell 19 provides a support for cutter bits 33 mounted in bit holders 34 which are formed as parts of an arcuate pad segment 36 welded to the cylindrical surface of the shell 19. As shown in Fig. 1, the bits 33 are staggered and are located in spaced tiers throughout the length of the cylindrical shell 19, so that upon rotation of the cutter head 10, a plurality of kerfs 37 spaced by cores 38 are cut into the coal seam 12.

The arcuate pad segments 36 alternate in each tier with a cylindrical flange 39 which extends radially inward from the surface of the cylindrical shell 19, and which extends a short distance radially outward from the surface of the shell 19. The flanges 39 define supports for radially movable breakers 41 which are so disposed with reference to the kerfs 37 cut by the bits 33, that upon conditions later to be described in this specification the breakers 41 will move outward to break off the cores 38 left between the kerfs 37.

The rotary cutter head is driven by a pair of cutter chains 40 and 42 which are trained respectively around chain sprockets 43 and 44. The chain sprocket 43 is made fast to the flange 24 of the end bell 21 by a key 46, and the chain sprocket 44 is likewise made fast to the flange 28 of the end bell 22 by a key 47. Each of the cutter chains 40 and 42 support cutter bits 48 which are staggered in the manner shown to cut kerfs 49 of such a dimension as to clear the frames 11, 11, so that the cutting head 10 may advance with the frame members 11 in accordance with the rate of feed movement of the continuous miner.

Means are provided for imparting radial movement to the breakers 41 and to cause them to move outward radially when the cores 38 between the kerfs 37 have built up as the cutting head 10 advances with the side frames 11 into the coal seam 12. The breakers 41 are preferably moved outward after a certain number of revolutions of the cutting head 10 have taken place, and it is also preferable that the movement outward and then inward is accomplished within a minimum amount of time so that the breakers 41 will be in contact with the cores 38 only long enough to cause breaking thereof. By causing the breakers 41 to operate only when a sufficient depth of core has been built up by the action of the cutter bits 33, it is possible to obtain larger coal fragments than are possible by the action of the cutter bits alone. In order to move the breakers 41 outward, the rotation of the drum 19 is employed to drive a camshaft to move the breakers 41 radially against the cores 38.

The radial movement of the breakers 41 is accomplished by a hollow camshaft 51 which turns on the shaft 16, and which rotates in timed relationship with respect to the drum or shell 19. The cam shaft 51 is supported at one end on the shaft 16 by a bushing 52, and is provided with an external spline 52a at its other end which mates with an internally splined sleeve 53 which together with the shaft 16 provides a recess 54 for a bearing 56 which is held in position by a snap ring 55a.

A series of cams 57 are held to the camshaft 51 by countersunk cap bolts 58, and are spaced along the length of the camshaft 51 by spacing collars 59, the splined sleeve 53 completing the assembly and spacing of the cams 57 on the camshaft 51.

The breakers 41, which are moved by the cams 57 include a cam follower 61 which is movable within a bore 62 formed in the flange 39. The interior end of the cam follower 61 is chamfered to provide clearance for a cam roller 63 journalled on a pin 64 in the cam follower 61. The cam follower 61 is urged against the cam 57 by a coiled spring 66 held between a shoulder 67 of the follower 61 and a retainer spanner nut 68 threaded into the flange 39. Each cam follower 61 is provided with a tapered roller 69 extending beyond the flange 39, the axis of rotation of the tapered roller 69 being inclined with respect to an imaginary axis lying on a radius of the cylindrical shell 19 and being also in a plane passing through the center of rotation of the cylindrical shell 19. The detail of constructing the tapered roller 69 is more clearly shown with respect to Lindberg application Serial No. 156,607, filed April 18, 1950. The roller 69 is tapered so that a surface element thereof coincides with a surface element of the cam follower 61, and so that the cam follower 61 together with the tapered roller 69 can move radially past the retaining ring 68 and within the bore 62 according to the position of the cam 57.

As shown, a surface element of the tapered roller 69 is parallel to a side wall of the kerf 37 and is adapted to move upon outward movement of the cam follower 61 into the kerf 37, and in such a fashion that a diametrically opposite surface element thereof will contact the corner of the core 38 and fragment the coal thereat. As seen also, each tapered roller 69 is inclined oppositely from the tapered roller of the opposite breaker 41 on the opposite side of the drum 19 in each tier. By inclining the opposite tapered roller in the opposite direction and by staggering the breakers in each tier, the tapered rollers 69 can enter the kerfs 37 and break off opposite corners of the cores 38.

The cams 57 are displaced angularly with respect to an adjacent cam so that the breakers 41 will move sequentially outward to reduce the amount of power necessary to fragment coal from the cores 38 as the cutter head 10 revolves. As shown in Fig. 1 the cams 57 are spaced 120° apart so that only one of the breakers 41 is in contact with a core 38 at any one time. The contour of each cam is no part of the present invention except as it is desirable to each cam to have a rapid lift and fall so that the breakers 41 will move outward rapidly to break the cores 38 and then move inward while the cutting action of the cutters 33 is continued until the breakers 41 again move outward.

The cutters 33 are so designed that they lie on a circle having a radius which is greater than the radius of the breakers 41 when fully extended by the cams 57 to afford clearance at all times for the breakers 41 irrespective of whether the cutter bits 33 have cut a sufficiently keep kerf 37 to be broken off by the tapered rollers 69.

Means are provided for imparting rotation to the camshaft 51 in timed relationship to the rotation of the drum or shell 19. To this end the shaft 51 is formed at one end with a cup shaped annulus 71 defining an internal ring gear 72. An eccentric 73 is formed on the stationary shaft 16 and is provided with a bearing 74 which provides a support for a gear 76 meshing with the internal ring 72. The gear 76 is adapted to turn on the bearing 74 while so meshing with the internal ring gear 72 and is coupled to rotate with the drum 19 while turning about the eccentric 73 and the bearing 74.

The gear 76 is thus provided with a diametrical slot 77 which provides a path of travel for a coupling plate 78 having a raised diametrical land 79 having a sliding fit in the slot 77. The coupling plate 78 has a central circular opening 81 of sufficient size to clear the shaft 16 irrespective of the position of the coupling plate on the gear 76. The coupling plate 78 is formed on the other side thereof with a raised diametrical land 82 which is located 90° angularly of the land 79. The end bell 21 is provided with a diametrical slot 83 in which the diametrical land 82 of the coupling plate 78 may slide.

It will be seen that the driving torque on the chain sprockets 43 will be transmitted into the end bell 21 and that the driving torque will be transmitted through the coupling plate 78 into the gear 76 which meshes with the internal ring gear 72 as the gear 76 turns about the eccentric 73. The coupling plate 78 will thus travel in an orbital path in transmitting driving torque from the end bell 21 to the eccentrically mounted gear 76. The internal ring gear 72 will thus be driven by the eccentrically mounted gear 76 at a ratio corresponding to the ratio of the pitch diameters of the meshing gears 72 and 76.

Preferably, the gears 76 and 72 are so selected that the pitch diameter of gear 72 with respect to the pitch diameter of gear 76 will be in ratio of twenty to nineteen, or in other words, the gear 76 will make twenty revolutions while the gear 72 will make nineteen revolutions. Obviously, then the drum or shell 19 will make twenty revolutions while the cam shaft 51 will make nineteen revolutions. Thus the drum 19 will advance one revolution with respect to the cam shaft 51 while the cam shaft 51 is making nineteen revolutions. It will be readily apparent, that each breaker 41 will move outward radially on its cam follower 61 as the cam follower 61 follows the contour of the cam 57. Since there are two diametrically opposed breakers 41 in each tier, one breaker 41 will move outward radially for each ten revolutions of the cylindrical shell 19. According to the pitch diameter ratios selected for the gears 72 and 76 each breaker 41 may move outward radially as seldom or as often as desired.

In operation, the cutters 33 mounted on the cylindrical shell 19 cut the kerfs 37 which alternate with the cores 38. The rotation of the shell 19 together with the floating eccentrically mounted gear 76 imparts rotation to the internal ring gear 72 and the cam shaft 51. As explained above, the gear ratios are so chosen that the cam shaft 51 will make nineteen revolutions for each twenty revolutions of the shell 19, and in so doing each breaker 41 will thus advance one revolution with respect to nineteen revolutions of the cam shaft 51, and in so doing will be moved outward radially by its associated cam 57 to break the core 38. In other words, the breaker 41 will move outward against the core 38 once during each twenty revolutions of the cylindrical shell 19. Since the breakers in each tier are in pairs oppositely disposed from each other, the movement of the breakers in each tier will alternate for every ten revolutions of the cylindrical shell 19.

As explained above, the cams 57 are angularly spaced on the cam shaft 51, so that one of the breakers will be moving outward six times in each twenty revolutions of the cylindrical shell 19, or in other words, a breaker will move against a core every three and one-third revolutions of the shell 19.

The frames 11 which support the cutting head according to the present invention are a part of any suitable mechanism for moving the frames with respect to the seam face, both up and down, and with a crowding motion into the seam. The cutting action afforded by the cutter bits 33 and the cutter chains 40 and 42 is of course a function of the power expended in crowding the frames 11 against the seam, and also that expended in moving the frame 11 up and down with respect to the seam 12. The mechanism for driving the cutter chains 40 and 42 and the mechanism for crowding and swinging the frames 11 with respect to the seam 12 forms no part of the present invention, and any suitable mechanism accomplishing such a purpose is contemplated for use with the cutter head according to the present invention.

Thus has been described a novel and useful cutting head for removing coal or other frangible material from a seam without the use of explosives. According to the present invention it is possible to obtain a higher percentage of lump coal than has heretofore been possible in the use of continuous miners constructed in accordance with the prior art. The cutter head according to the present invention also makes it possible to obtain a greater percentage of lump coal with the expenditure of little, if any, additional power.

While the invention has been described in terms of an embodiment which it may assume in practice, it is not intended that the invention be limited by the embodiment shown nor otherwise than by the terms of the appended claims.

I claim:

1. In a cutting head for a machine for mining coal from a seam, a rotating drum having cutter bits mounted thereon for cutting spaced kerfs in said seam, breakers carried by said rotating drum and adapted to move outward with respect to the periphery of said drum in timed relation with the rotation of said drums for breaking the cores formed by the action of said cutter bits in cutting said kerfs, means for rotating said drum, a camshaft and cams mounted thereon for moving said breakers outward with respect to the periphery of said drum, said means affording a driving connection between said rotating drum and said camshaft comprising a gear mounted eccentrically of the turning center of said drum, a second gear mounted on said camshaft and meshing with said first gear, and a coupling for drivably connecting said drum with said eccentrically mounted gear.

2. In a cutting head for a machine for mining coal from a seam, a frame defining a support for a shaft, a drum mounted to rotate on said shaft and movable on said shaft with said frame with respect to said seam, cutter bits mounted on the periphery of said drum for cutting spaced kerfs in said seam, breakers carried by said drum and adapted to move outward with respect to the periphery of said drum in timed relationship with the rotation of said drum for breaking the cores formed between said kerfs, means for driving said drum rotatably, a camshaft and cams mounted thereon for moving said breakers outward with respect to the periphery of said drum in timed relationship to the rotation of said drum to break the cores formed by said cutter bits in cutting said kerfs, and means affording a driving connection between said rotating drum and said camshaft comprising a gear mounted eccentrically of the turning center of said drum, a second gear mounted on said camshaft and meshing with said first gear, and a coupling for drivably connecting said drum with said eccentrically mounted gear.

3. In a cutting head for a machine for mining coal from a seam, a frame defining a support for a shaft, a drum mounted to rotate on said shaft and movable on said shaft with said frame with respect to said seam, cutter bits mounted on the periphery of said drum for cutting spaced kerfs in said seam, breakers carried by said drum and adapted to move outward with respect to the periphery of said drum in timed relationship with said drum for breaking the cores formed between said kerfs, means for driving said drum, a cam shaft rotatable in timed relationship to said drum, cam followers for moving said breakers in accordance with the rotation of said cam shaft, and means for imparting rotation to said camshaft comprising a gear driven by said drum driving means, a gear meshing with said first gear and drivably connected to said cam shaft, and an orbitally movable coupling affording a driving connection between said first named gear and said drum driving means.

4. In a cutting head for a machine for mining coal from a seam, a frame defining a support for a shaft, a drum mounted to rotate on said shaft and movable on said shaft with said frame with respect to said seam, cutter bits mounted on the periphery of said drum for cutting spaced kerfs in said seam, breakers carried by said drum and adapted to move outward with respect to the periphery of said drum in timed relationship with the rotation of said drum for breaking the cores formed between said kerfs, means for driving said drum rotatably, and means for imparting outward movement to said breakers in said timed relationship comprising a gear train consisting of a pair of gears and cams means movable to impart said outward movement to said breakers and operatively connected to said gears, one of said gears being driven in an orbital path and coupled to said drum by an orbitally movable coupling, and the second gear of said train meshing with said one gear and drivably connected to said cam means.

5. In a cutting head for a machine for mining coal from a seam, a rotating drum having cutting bits mounted thereon for cutting spaced kerfs in said seam, breakers carried by said rotating drum and adapted to move outward with respect to the periphery of said drum in timed relationship with said drum for breaking the cores formed by the action of said cutter bits in cutting said kerfs, means for driving said drum, a camshaft and cams mounted thereon for moving said breakers outward in timed relationship to the rotation of said drum to break the cores formed by said cutter bits in cutting said kerfs, and means affording a driving connection between said camshaft and said drum comprising a gear train consisting of a pair of gears, one of said gears being driven in an orbital path and coupled to said drum by an orbitally movable coupling, and an internal ring gear meshing with said first gear and drivably connected with said camshaft said internal ring gear rotating at the same speed as said camshaft.

6. In a cutting head for a machine for mining coal from a solid seam thereof, a rotating support having cutter bits mounted thereon for cutting spaced kerfs in said seam, breakers mounted on said rotating support and adapted to move outward with respect thereto for breaking the cores formed by the action of said cutter bits, means for driving said support rotatably, and means for imparting outward movement to said breakers in timed relationship with respect to said support comprising a gear train including a pair of gears and cam means movable to impart outward movement to said breakers and operatively connected to said gears, one of said gears being driven in an orbital path with respect to the turning center of said support, an orbitally movable coupling drivably connecting said one gear to said rotating support, and the second gear meshing with the said one gear and drivably connected to said cam means.

7. In a cutting head for a machine for mining coal from a solid seam thereof, a rotating support having cutter bits mounted thereon for cutting spaced kerfs in said seam, breakers mounted on said rotating support and adapted to move outward with respect thereto, means for driving said support rotatably, a camshaft and cams mounted thereon for moving said breakers outward in timed relationship to the rotation of said support to break the cores formed by the action of said cutter bits, and means affording a driving connection between said camshaft and said rotating support comprising a gear train consisting of a pair of gears, one of said gears being movable in an orbital path with respect to the turning center of said rotating support, an orbitally movable coupling drivably connecting said one gear to said rotating support, and a second gear meshing with said one gear and turning said camshaft, said second gear rotating at the same speed as said camshaft.

References Cited in the file of this patent

UNITED STATES PATENTS

| Number | Name | Date |
|---|---|---|
| 1,116,355 | Morgan | Nov. 3, 1914 |
| 1,175,071 | Morgan | Mar. 14, 1916 |